(12) United States Patent
Klein, II et al.

(10) Patent No.: US 8,453,944 B2
(45) Date of Patent: Jun. 4, 2013

(54) ERGONOMIC SPRAY CAN ADAPTER AND POSITIONING APPARATUS

(75) Inventors: Richard J. Klein, II, Waterloo, IA (US);
Thomas J. Giblin, Waterloo, IA (US);
John L. Konefes, Cedar Falls, IA (US);
Nicholas J. Webb, Redding, CA (US);
Stephen Orsatti, Litchfield, MN (US)

(73) Assignee: The LaserCan Company, LLC, Cedar Falls, IA (US)

( * ) Notice: Subject to any disclaimer, the term of this patent is extended or adjusted under 35 U.S.C. 154(b) by 610 days.

(21) Appl. No.: 12/254,032

(22) Filed: Oct. 20, 2008

(65) Prior Publication Data
US 2010/0096472 A1   Apr. 22, 2010

(51) Int. Cl.
*B67D 7/08*   (2010.01)

(52) U.S. Cl.
USPC ............... 239/71; 239/73; 239/289; 239/337; 239/375; 222/402.13; 222/402.15

(58) Field of Classification Search
CPC ...... B67D 7/08; B67D 7/56; B05B 7/32; B05B 15/04
USPC ............. 239/708, 71–74, 374, 375–378, 289, 239/337; 222/402.13–402.15
See application file for complete search history.

(56) References Cited

U.S. PATENT DOCUMENTS 1,285,553 A * 11/1918 Bateman .......................... 362/96
2,941,700 A *  6/1960 Gable ....................... 222/402.15

(Continued)

FOREIGN PATENT DOCUMENTS

FR  2908965   5/2008
JP  11-253851  9/1999

(Continued)

OTHER PUBLICATIONS

"Aerosol Spray Trigger Gun", decoratingdirect.co.uk website.

(Continued)

*Primary Examiner* — Steven J Ganey
(74) *Attorney, Agent, or Firm* — Andrus, Sceales, Starke & Sawall, LLP

(57) ABSTRACT

An ergonomic adapter for an aerosol spray can helps to reduce finger pain and hand fatigue. The ergonomic adapter has a collar that fits around a body of an aerosol spray paint can such that a front portion of the collar is facing in front of the can just below the interface between the body and the domed top of the spray can. An arcuate finger strip extends upward from the rear side of the collar and over the push-button nozzle on the spray can when the adapter is fitted onto the body of the spray can. The collar and the arcuate finger strip are made of a resilient, flexible material such as butyl rubber. The arcuate finger strip preferably has a concave upper surface. The collar has enlarged traction pads positioned to facilitate gripping by the user. When the user grips the ergonomic adapter, the user's index finger rests in the concave, arcuate finger strip. When the user presses down on the finger strip, the push-button nozzle is actuated to expel spray paint, but the pressure from the nozzle is distributed and cushioned so that it does not cause as much pain or stress in the user's index finger. In one embodiment, the front of the adapter includes a compartment that houses a polychromatic light source for lighting the surface and/or a laser guide for targeting and positioning the spray can with respect to the surface.

17 Claims, 6 Drawing Sheets

U.S. PATENT DOCUMENTS

| | | | |
|---|---|---|---|
| 3,035,738 A * | 5/1962 | Bloom | 222/113 |
| 3,066,838 A * | 12/1962 | Hansen | 222/402.13 |
| 3,478,938 A * | 11/1969 | Krause | 222/402.14 |
| 4,089,440 A | 5/1978 | Lee | |
| 4,401,240 A * | 8/1983 | Brack | 222/323 |
| 4,427,134 A | 1/1984 | Almouli | |
| 4,432,474 A | 2/1984 | Hutchinson et al. | |
| 4,579,258 A | 4/1986 | Brown et al. | |
| D283,801 S | 5/1986 | Brown et al. | |
| D287,394 S | 12/1986 | Yamamoto | |
| 4,836,671 A | 6/1989 | Bautista | |
| 4,912,750 A | 3/1990 | Foster | |
| 4,971,257 A * | 11/1990 | Birge | 239/708 |
| 5,517,768 A | 5/1996 | Aviv | |
| 5,598,972 A | 2/1997 | Klein, II et al. | |
| 5,819,985 A | 10/1998 | Brody | |
| 5,992,707 A | 11/1999 | Gaichuk | |
| 5,992,708 A * | 11/1999 | Gaichuk | 222/402.15 |
| 6,029,862 A | 2/2000 | Jones | |
| 6,390,333 B1 * | 5/2002 | Bozzo | 222/113 |
| 6,494,349 B1 * | 12/2002 | Thompson et al. | 222/402.15 |
| 6,896,192 B2 | 5/2005 | Horan et al. | |
| 6,981,622 B2 | 1/2006 | Brody | |
| 7,021,499 B2 | 4/2006 | Hansen et al. | |
| 7,040,546 B2 | 5/2006 | Horan et al. | |
| 7,121,435 B2 | 10/2006 | Brody | |
| 7,216,784 B2 | 5/2007 | Brody | |
| 7,244,464 B2 | 7/2007 | Robens et al. | |
| 7,264,143 B2 | 9/2007 | Khubani et al. | |
| 7,316,334 B1 | 1/2008 | Brody | |
| 2007/0080178 A1 * | 4/2007 | Barry | 222/402.15 |

FOREIGN PATENT DOCUMENTS

| | | |
|---|---|---|
| WO | 2007/140407 A2 | 12/2007 |
| WO | 2008-017592 | 2/2008 |

OTHER PUBLICATIONS

"Spring Cleaning Made Easier", Aerosol Spray Holder, dynamic-living.com website.

"Aerosol Spray Can Adapter", #K07099 by Krylon Diversified Brands, hardwareandtools.com website.

"Spray Grip" for Aerosol Spray Paint Cans, RUST-OLEUM 243546, castlewholesalers.com website.

* cited by examiner

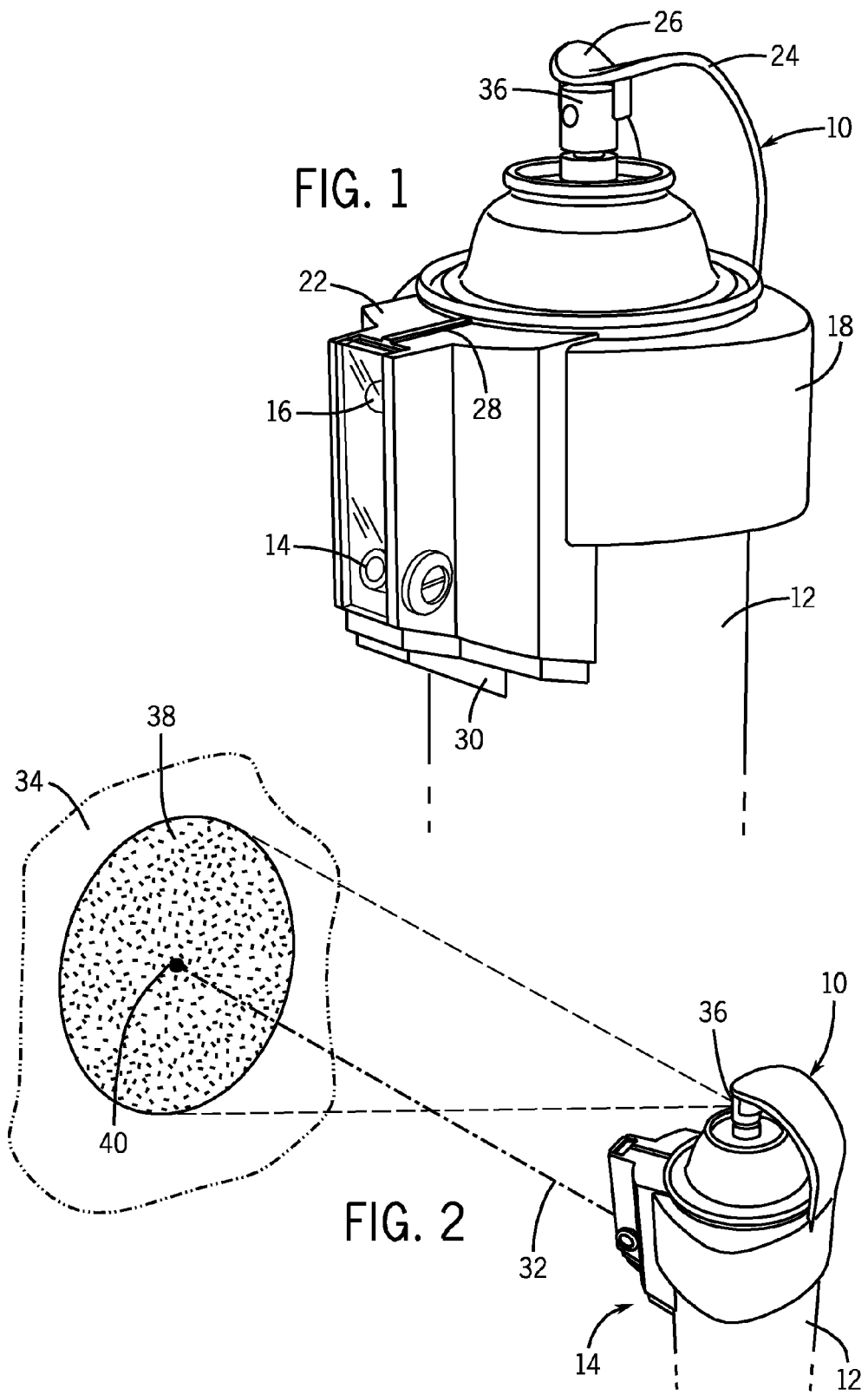

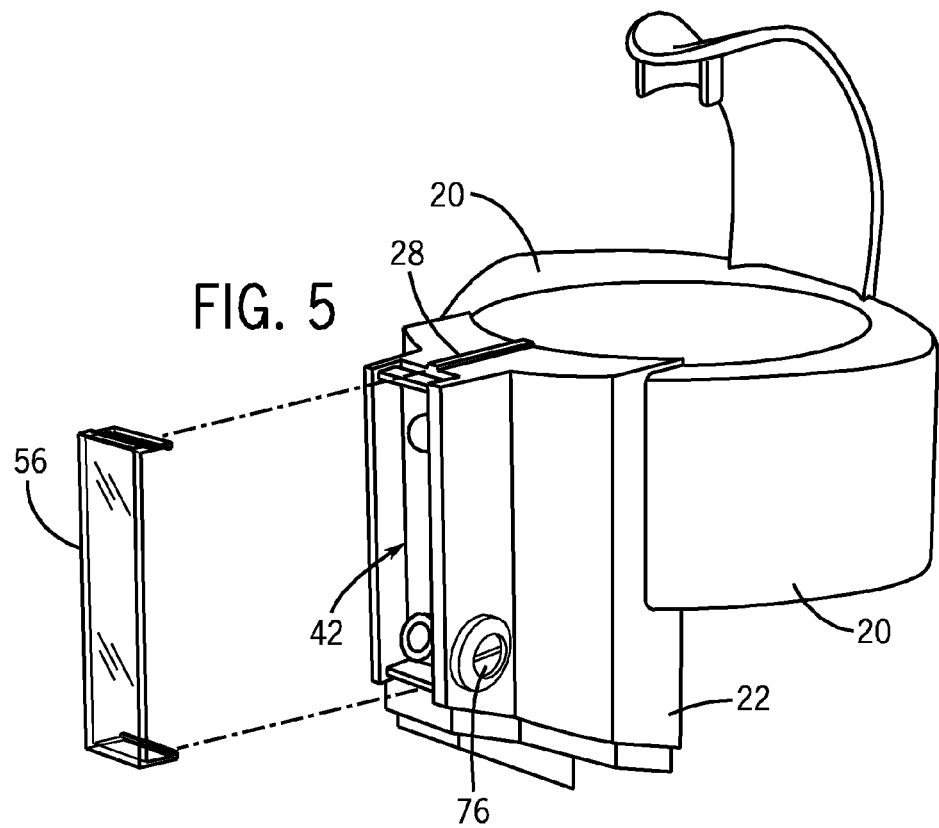
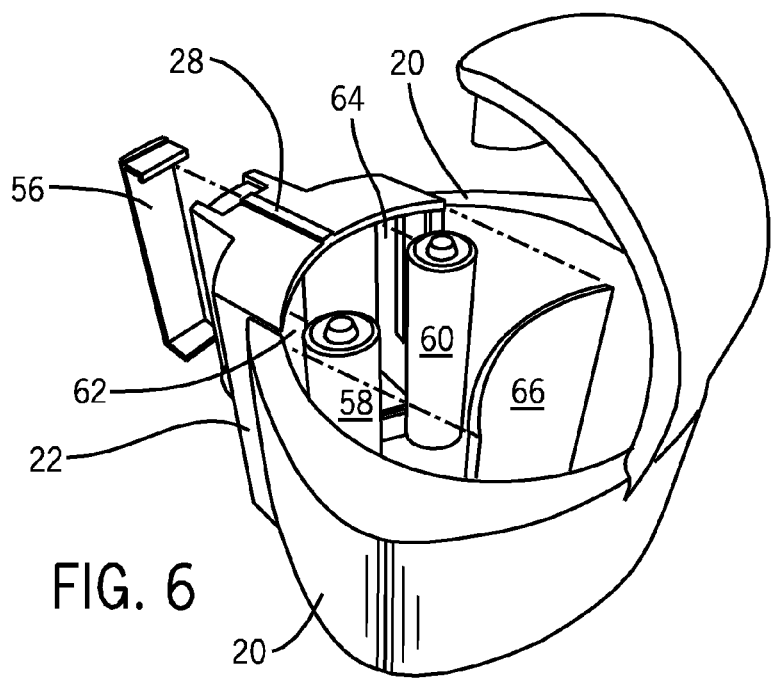

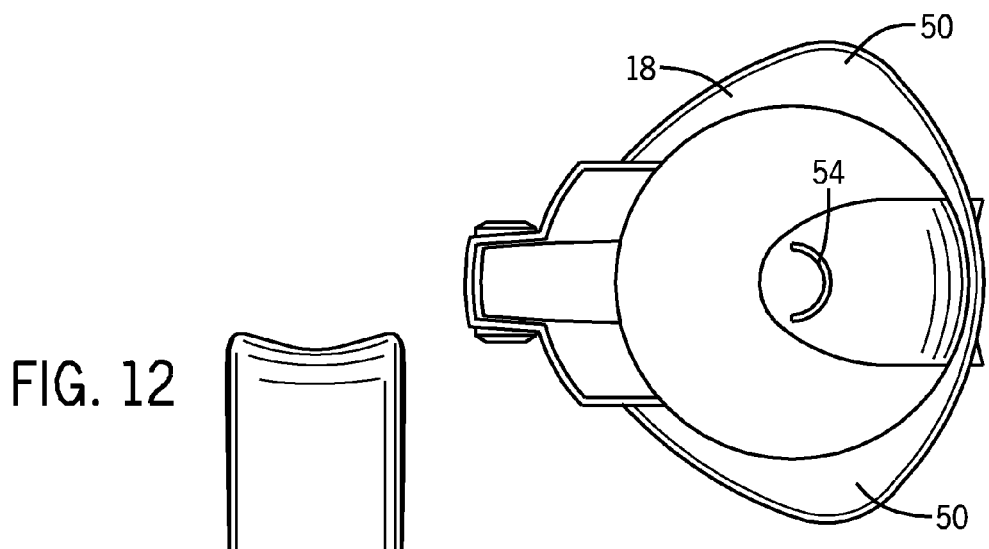
FIG. 12
FIG. 13
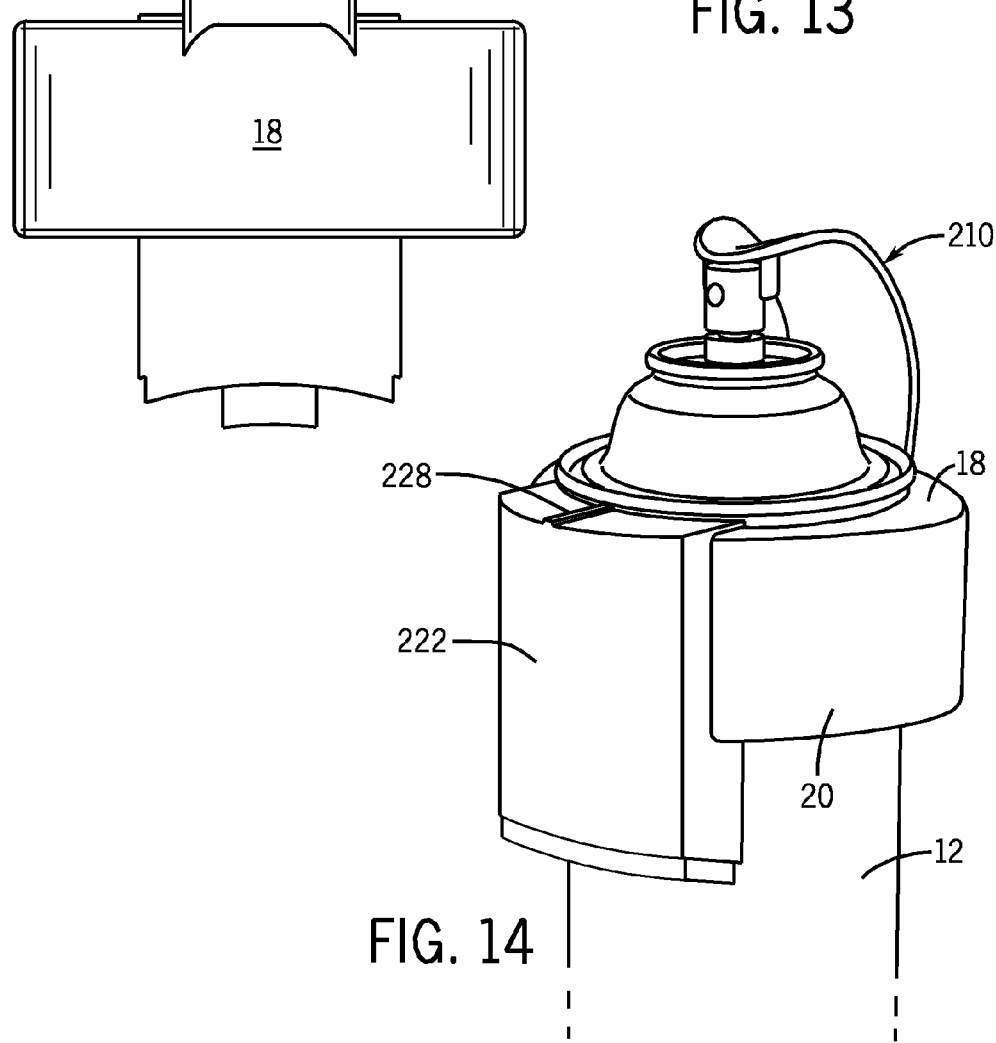
FIG. 14

ERGONOMIC SPRAY CAN ADAPTER AND POSITIONING APPARATUS

FIELD OF THE INVENTION

The invention relates to spray painting with aerosol spray cans. In particular, the invention is an adapter that facilitates ergonomic gripping and operation of an aerosol spray can, as well as proper positioning of the spray can with respect to the surface being painted, and/or proper lighting of the surface being painted.

BACKGROUND OF THE INVENTION

Common aerosol spray cans have a cylindrical body and a domed top surface with a depressible, finger actuated nozzle located at the top of the dome. The design of the common spray can causes finger pain and hand fatigue. To address this problem, the prior art includes many spray can adapters having trigger arrangements intended to alleviate finger pain and hand fatigue. One of the problems with these types of trigger arrangements is that the user tends to lose their intuitive sense of touch or feel for the spray because the index finger is located remote from the push-button nozzle via some type of mechanical mechanism. It may take the user several minutes or more to obtain a comfortable sense of touch, if at all.

Most spray can users employ improper spraying techniques, which leads to overspray, excessive waste, paint runs and generally poor quality. The primary issue in this regard is failure to maintain the spray can at the appropriate standoff distance from the surface being painted. Horan et al. U.S. Pat. No. 6,896,192 describes a spray can targeting and positioning system which uses a light beam or a pair of light beams to help the user maintain the spray can at an appropriate standoff distance. Horan et al. U.S. Pat. No. 6,896,192 issued on May 24, 2005, is entitled "Spray Can Targeting and Positioning System", assigned to the assignee of the present invention and is incorporated herein by reference. The Horan et al. '192 patent discloses several embodiments. In one embodiment, a light beam targeting and positioning system is mounted to the body of a handle triggering mechanism that attaches to the dome of a spray can. The triggering mechanism depresses the push-button nozzle on the spray can when the user pulls the trigger. The light beam targeting and positioning system in this embodiment is a dual beam type as disclosed in Klein et al. U.S. Pat. No. 5,598,972 issuing on Feb. 4, 1997 and entitled "Optical Spray Paint Optimization System And Method", which is also assigned to the assignee of the present application, and is also incorporated herein by reference. This light beam targeting and positioning system uses a laser light source and a beam splitter to generate a pair of non-parallel light beams that propagate towards the surface being painted. The first light beam is fixed in its orientation and is often called the reference beam. Typically, the light beam targeting and position system should be mounted to the spray can so that a spot illuminated by the reference beam resides in the center of the spray pattern on the surface being painted. The angular orientation of the other beam, often called the gauge beam, can be adjustable, although this is not always desirable. The angular orientation of the gauge beam is selected so that it converges towards the reference beam. When the spray can is positioned at the proper standoff distance from the surface being painted, the spot illuminated on the surface by the gauge beam converges with the spot illuminated by the reference beam either to form a single point on the surface, or to become aligned either horizontally or vertically on the surface being painted. In this way, the user is provided constant feedback as to whether the spray can is properly positioned with respect to the surface being painted.

In another embodiment shown in the Horan et al. '192 patent, the light beam targeting and positioning system is not associated with a triggered handle assembly. Rather, it is attached to a spray can using a strap-like attachment device. In this embodiment, the user grips the spray can as normal and depresses the push-button nozzle with their index finger to spray paint onto the surface, but with the aid of the light beam targeting and positioning system mounted to the spray can, thereby providing feedback to the user as to the proper targeting and positioning of the spray can with respect to the surface being painted.

Another embodiment disclosed in the Horan et al. '192 patent application uses a single light beam spray gun positioning system as disclosed in U.S. Pat. No. 7,040,546, issuing on May 9, 2006 entitled "A Single Beam Spray Gun Positioning System", which again is assigned to the assignee of the present application and is incorporated herein by reference. In the single beam system, the orientation of the single light beam is adjusted so that the light beam will illuminate at the center of the spray pattern on the surface when the spray gun is located at the appropriate standoff distance from the surface. The single beam system is a simpler mechanism than the dual beam mechanism, although it is not designed to provide accurate targeting feedback when the spray gun is not positioned at the appropriate standoff distance from the surface, as is provided by the reference beam in the dual beam system discussed above.

While these prior art patents certainly disclose the use of a light beam targeting and positioning system in connection with an aerosol spray can, they do not suitably address the issue of finger pain and hand fatigue in a practical fashion. As mentioned above, it is believed that users shy away from handle trigger arrangements because they loose their intuitive feel for the push-button nozzle. For example, when a user presses a push-button nozzle directly with their index finger, the user can immediately feel subtle rocking and/or pressure changes. Trigger mechanisms, in large part, eliminate this type of tactile feedback. On the other hand, the acute pressure exerted by the push-button nozzle on the index finger as well as the difficulty that some people have in grasping the body of the can for long periods of time can be quite annoying and tends to limit the amount of time that users are willing to paint with aerosol spray paint cans.

Another problem frequently facing spray can users is the lack of sufficient lighting for the surface being painted. This has been addressed in the prior art, for example, by placing a light on the front end of a trigger handle mechanism that is attached to a spray can. This feature can be particularly helpful in circumstances where lighting is poor and it is inconvenient or impractical to set up ancillary lighting.

SUMMARY OF THE INVENTION

In a broad sense, the invention is an ergonomic adapter for a conventional aerosol spray paint can having a push-button nozzle that extends upward from a top surface of the can. The ergonomic adapter has a collar that fits around the body of the aerosol spray can. An arcuate finger strip made of a resilient, flexible material extends from a rear side of the collar upward and over the push-button nozzle on the spray can when the adapter is fitted onto the body of the spray can. The arcuate finger strip preferably has a concave upper surface within which the user's index finger rests. A bottom surface of the finger strip engages the push-button nozzle, preferably at a location defined by a stop extending downwardly from the finger strip. In order to commence spraying, the user grasps the collar in their palm and rests their index finger on top of the arcuate finger strip, in a manner quite similar to how one would normally grab an aerosol spray can. The user then pushes downward on the push-button nozzle with the resilient, flexible arcuate finger strip between the user's index finger and the push-button nozzle. Such an arrangement provides cushioning to the user's index finger and also redistributes the pressure load on the user's finger. At the same time, use of an ergonomic adapter does not substantially interfere with the tactile feedback from the push-button nozzle to the user's index finger. The user thus maintains an intuitive sense of touch and feel even when the ergonomic adapter is used.

The collar preferably includes two arcuate arms extending forward from the location that the finger strip attaches to the rear of the collar, as well as a rigid connecting piece that connects together the front ends of the collar arms in the front of the spray can. Alternatively, the resilient flexible collar can be designed to completely encompass the body of the spray can. Preferably, the arms of the collar and the arcuate finger strip are made of the same elastomeric material. The preferred elastomeric material is silicone rubber having a durometer of 80, and in any event a durometer between 30 and 90. The thickness of the finger strip at the location where the index finger depresses downward on the push-button nozzle is preferably about ⅛ inch.

The inside diameter of the collar is preferably slightly smaller than the diameter of a typical aerosol spray can, i.e. the preferred inside diameter of the collar is slightly greater than 2½ inches. The resilient, flexible collar is stretched slightly to fit onto the body of the can and friction serves to hold the collar in place on the can.

The outer surface of each collar arm includes an enlarged traction pad, one on each side, for ergonomic gripping purposes. If desired, gripping knurls can be molded into the traction pads. It has been found that the overall configuration of the adapter fosters proper spray technique by placing the user's hand in a proper position with respect to the spray can. Moreover, it has been found that the use of the adapter reduces the tendency of users to over-grip, and therefore reduces hand fatigue in this regard. The enlarged traction pads are located symmetrically rearward of the push-button nozzle. The ergonomic adapter is equally well suited for right handed users as it is for left handed users. Preferably, the material of the collar and the arcuate finger strip has a rough finish, such as an aggressive EDM finish, in part to facilitate improved friction fitting as well as ergonomic gripability.

While it may be desirable in some circumstances to design the resilient flexible collar to completely encompass the body of the spray can, it is preferable, as mentioned, that the collar comprises two arms made of resilient, flexible material that are connected together with a rigid connecting piece at the front of the can. In accordance with another aspect of the invention, the rigid connecting piece serves as a mounting location for a light beam targeting and positioning system, as well, if desired, as a polychromatic white light source to illuminate the surface being painted. It is preferred that a light source for a single beam targeting and positioning system as well as the polychromatic light source be located within a common lighting chamber located at the forwardmost point of the rigid connecting piece. In the preferred embodiment, the light sources are vertically aligned within the lighting chamber. The vertical alignment allows the weight of the electronics relating to the lighting sources in the lighting chamber is balanced along the centerline of the rigid connecting piece.

The preferred light source for the light beam targeting and positioning system is an LED class 1, class 2 or class 2M laser source which is mounted to a rotatable horizontal axle, located in the lighting chamber. The rotational position of the horizontal axle, and consequently the angular orientation of the light beam source, is preferably adjusted in the factory so that the light beam illuminates a spot in the middle of the spray pattern when the spray can is at the desired standoff distance from the surface, for example, 9 to 12 inches. Preferably, the axle head is adapted to allow adjustments of the orientation of the light beam source in the field. The preferred head includes demarcations which correlate the rotational position of the axle to a desired standoff distance. While the preferred embodiment of the invention uses a single beam targeting and positioning system, the invention contemplates the use of a dual beam system as described in the above-noted prior art, incorporated patent applications.

The polychromatic light source is preferably mounted in the upper portion of the lighting chamber. Preferably, a removable clear lens, such as a polycarbonate lens, snaps onto the rigid connecting piece over the common lighting chamber and provides a window through which the light sources illuminate.

The preferred rigid connecting piece includes a pair of battery compartments accessible from the rear of the rigid piece. The battery compartments hold elongated cylindrical batteries such as AA batteries. It is desirable that the weight of the batteries be symmetrically balanced. On the other hand, it is desirable that the chamber for the light beam targeting and positioning device and the surface illuminating light not protrude excessively forward of the spray can surface. Therefore, it is desirable in accordance with one aspect of the invention to split the battery compartment such that one battery is located on one side of the chamber for the light sources and the other battery is located on the other side of the chamber for the light sources.

Various other features, objects and advantages of the invention will be made apparent from the following description taken together with the drawings.

BRIEF DESCRIPTION OF THE DRAWINGS

FIG. 1 is an isometric view showing a first embodiment of an ergonomic adapter made in accordance with the invention being mounted to an aerosol spray can.

FIG. 2 is a schematic drawing illustrating the use of a single beam spray can targeting and positioning system incorporated into the ergonomic adapter shown in FIG. 1.

FIG. 5 is a perspective view of an ergonomic adapter constructed in accordance with the invention having a front polycarbonate lens broken away from lighting chamber in a rigid connecting piece.

FIG. 6 is a top perspective view of an ergonomic adapter constructed in accordance with the first embodiment of the invention illustrating the battery compartments accessible from the rear of the rigid connecting piece.

FIG. 12 is a rear elevational view of an ergonomic adapter constructed in accordance with the first embodiment of the invention.

FIG. 13 shows a bottom plan view of an ergonomic adapter constructed in accordance with the first embodiment of the invention.

FIG. 14 illustrates an ergonomic adapter constructed in accordance with the second embodiment of the invention being mounted to an aerosol spray can.

DETAILED DESCRIPTION OF THE DRAWINGS

Figure 3:
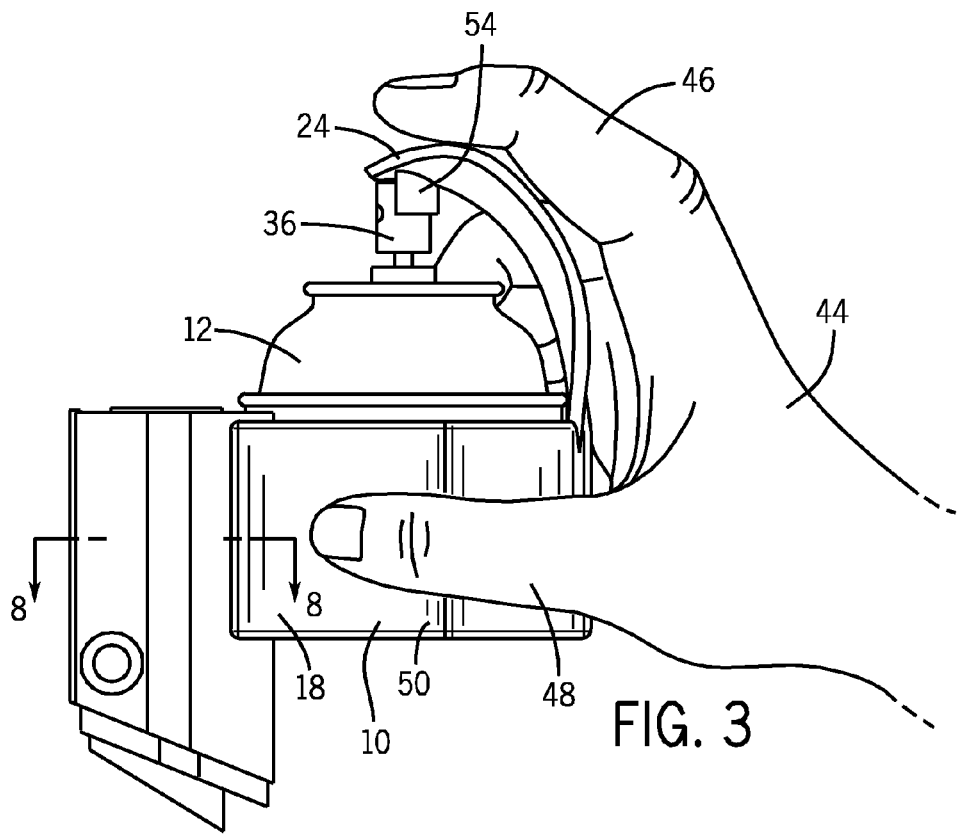
FIG. 3 is a side view of the first embodiment as shown in FIG. 1 also showing the user's hands gripping the ergonomic adapter with the user's index finger resting along the arcuate finger strip.

In a preferred embodiment of the invention, an ergonomic adapter 10 for use in connection with an aerosol spray can 12 includes a single light beam targeting and positioning system 14 as well as a polychromatic light source 16 for illuminating the surface to be painted. This preferred embodiment is illustrated in FIGS. 1-13. FIG. 14, on the other hand, illustrates another preferred embodiment of the invention in which the ergonomic adapter 210 does not include a single-beam targeting and positioning system 14 or a polychromatic light source 16.

Referring generally to FIGS. 1-13, and in particular FIG. 1, the ergonomic adapter 10 includes a collar 18 that fits around a body of the aerosol spray can 12. The collar includes two arms 20, see for example FIGS. 4-6, which extend from the rear of the adapter 10 forward in an arcuate manner. A rigid connecting piece 22, preferably made of molded ABS or nylon, connects together the collar arms 20 at the front of the spray can 12. The collar arms 20 can be manufactured with a barb at their end to facilitate attachment into a slot within the rigid connecting piece 22, or alternatively, an in-molding procedure can be used to attach the collar arms to the rigid connecting piece 22. An arcuate finger strip 24 extends upward from the rear of the collar 18. The arcuate finger strip 24 has a concave upper surface 26 which is designed to comfortably receive the index finger of the user. An alignment marker 28 is molded into the top surface of the rigid collar 22. Preferably, the alignment marker 28 will be painted or printed to be a different color than the color of the rigid collar 22. A power switch 30 for the light sources 14, 16 extends downward from the bottom of the rigid connector 22. While the preferred power switch is simply an on/off switch, it may be desirable to implement the invention with a four function switch. If a four function switch is used, the switch would have a fully off position, a fully on position and a position in which the light beam targeting and positioning system was on, and a position in which the polychromatic light source was on.

As discussed in more detail below, the collars 18 and the arcuate finger strip 24 are preferably made of a resilient elastomeric material such as butyl rubber or silicone.

Referring to FIG. 2, the operation of the single light beam targeting and positioning system is illustrated. The single beam positioning system operates on fundamentally the same principle as that described in U.S. Pat. No. 7,040,546 entitled "Single Beam Spray Gun Positioning System" issuing on May 9, 2006 which is assigned to the assignee of the present application and incorporated herein by reference. Briefly, the user turns on the single beam light source 14 using the switch 30. The single beam light source 14 emits a light beam 32 towards the surface 34 being painted. The user then approximates the known optimal distance of the spray can nozzle 36 from the surface 34, and commences operation of the spray can 12 to discharge spray paint in a spray pattern 38 on the surface 34. The user maintains the nozzle 36 at the optimal distance from the surface 34 by maintaining the illuminated point 40 of light from the single beam light source 14 in the center of the spray pattern 38. As the user moves the spray can 12 and adjusts the pressure and subtle angular adjustments of the push-button nozzle 36, the user is able to visually ascertain the position of the illuminated point 40 and thereby maintain the light beam as close as possible to the center line of the spray pattern 38. The position of the single beam light source 14 is offset from the location of the nozzle 36 and its angular orientation is preferably preset in the factory for a distance of about 9-12 inches, which is the preferred standoff distance for most spray painting applications. If the user is holding the spray can 12 too far from the surface 34 the illuminated point 40 will appear in the top half of the pattern 38. If the user is holding the spray can 12 too close to the surface 34 the illuminated point will appear in the bottom half of the pattern 38.

As mentioned, it may be desirable to use a dual beam targeting and positioning system in lieu of a single beam system. A suitable dual beam system is described in Klein, II et al U.S. Pat. No. 5,598,972 entitled "Optical Spray Paint Optimization System and Method" issuing on Feb. 4, 1997 which is assigned to the assignee of the present invention and is incorporated herein by reference. Of course, in accordance with the present invention, it is desirable to locate the dual beam system in the vertical lighting chamber 42, FIG. 5, which is located in the front of the rigid connector 22.

Figure 4:
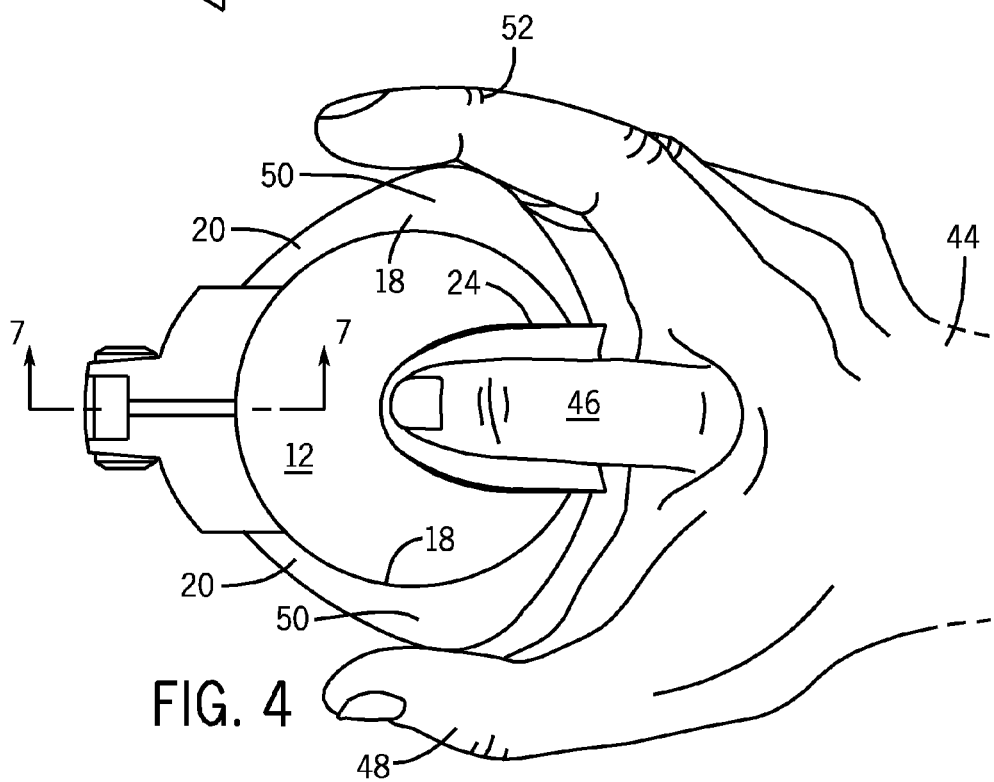
FIG. 4 is a top view of the illustration shown in FIG. 3.

Referring now to FIGS. 3 and 4, the user's hand 44 grips the ergonomic adapter 10 such that the user's index finger 46 rests on the arcuate finger strip 24, the user's thumb 48 grips a large traction pad 50 on one side of the collar 18 and the user's other fingers 52 grip a traction pad 50 on the other side of the collar 18. The collar 18 and the traction pads 50 are located rather high on the spray can, which requires the user to grip the adapter with the user's thumb 48 and the other fingers 52 rather high relative to the height of the spray can. As mentioned, such an orientation of the hand 44 on the spray can fosters proper spraying techniques. In addition, the tendency to over-grip the spray can is reduced because of the ergonomic traction pads 50. If desired, gripping knurls can be placed on the front side of the traction pads 50 in order to further promote ergonomic gripping of the adapter by people having various hand sizes. Such knurling is not shown in the drawings. The collar 18 and the arcuate finger strip 24 are preferably molded butyl rubber such as sold under the trademark C-FLEX, or silicone rubber, although other elastomeric materials or even appropriate thermoplastic materials may be suitable. Preferably, the collar 18 and the arcuate finger strip 24 have a rough finish, such as an aggressive EDM finish, on all surfaces. The rough finish enhances surface friction which is helpful for holding the adapter 10 to the spray can 12, as well as facilitating gripability by the user's hand 44. The preferred durometer is substantially about 80 (although durometers between 30 and 90 may be suitable), thereby rendering the collar 18 and arcuate finger strip 24 flexible and resilient.

The thickness of the arcuate finger strip is preferably about ⅛ inch although the thickness can vary slightly throughout the strip. The curvature of the concave surface 26 on the arcuate finger strip 24 is preferably about a radius of 0.75 inches at the location where the finger tip resides, but the finer strip 24 flattens as it approaches the collar 18. A stop 54 for engaging the push-button nozzle on the spray can 12 extends downward from the arcuate finger strip 24 near the distal end of the finger strip 24. The stop 54 provides a seating location for the push-button nozzle 36 against the bottom surface of the finger strip 24. The seating location for the push-button nozzle 36 is located substantially directly below the normal position for the user's index finger 46. The stops shown in the Figures have curvature which is sized to comfortably receive a standard sized push-button nozzle 36. It may be desirable, however, to widen the curvature of the stop 54 in order that the adapter comfortably fit on spray cans having a larger sized push-button nozzle 36.

Referring now to FIGS. 5 and 6, a removable clear polycarbonate lens 56 covers the front opening of the lighting chamber 42 in the rigid connector piece 22. It may be desirable to provide replacement lenses 56 when the unit is sold commercially. The clear polycarbonate lens 56 is designed to snap onto the rigid connector piece 22. As shown best in FIG. 6, the light sources are powered by AA batteries 58, 60. The batteries 58, 60 each reside in a separate battery compartment 62, 64 which are accessible from the rear of the rigid connector 22. A compartment door 66 is removably attached to the rigid connector 22 to cover the battery compartments 62, 64 when the batteries 58, 60 are loaded. The compartment door 66 has an arcuate or partially cylindrical shape in order to accommodate the surface of the spray can 12.

Figure 7:
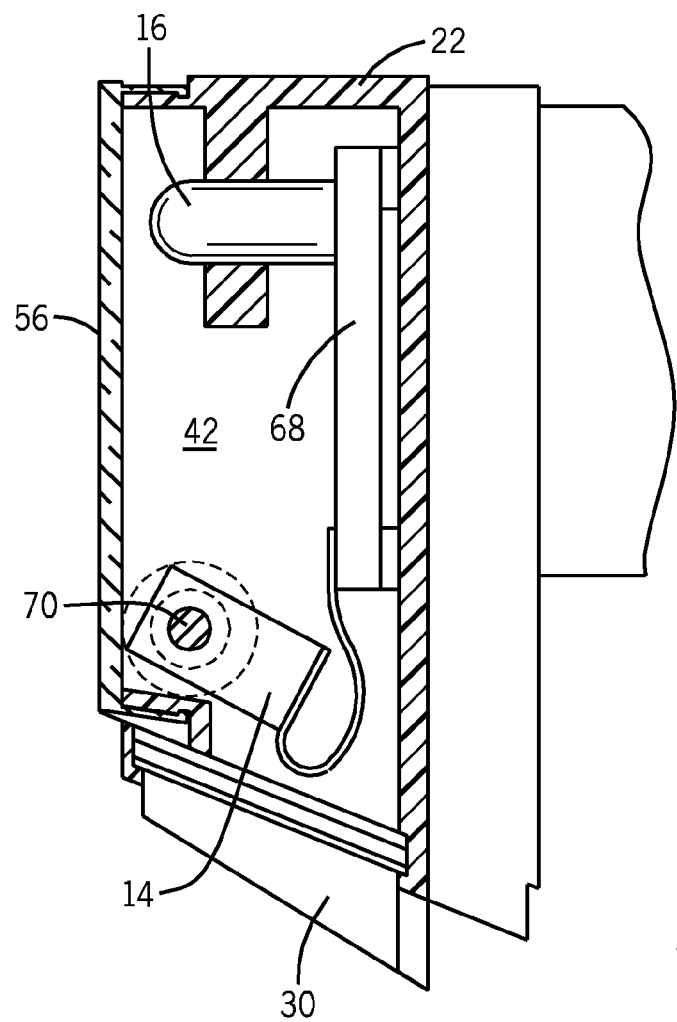
FIG. 7 is a longitudinal sectional view taken along line 7-7 in FIG. 4.
Figure 8:
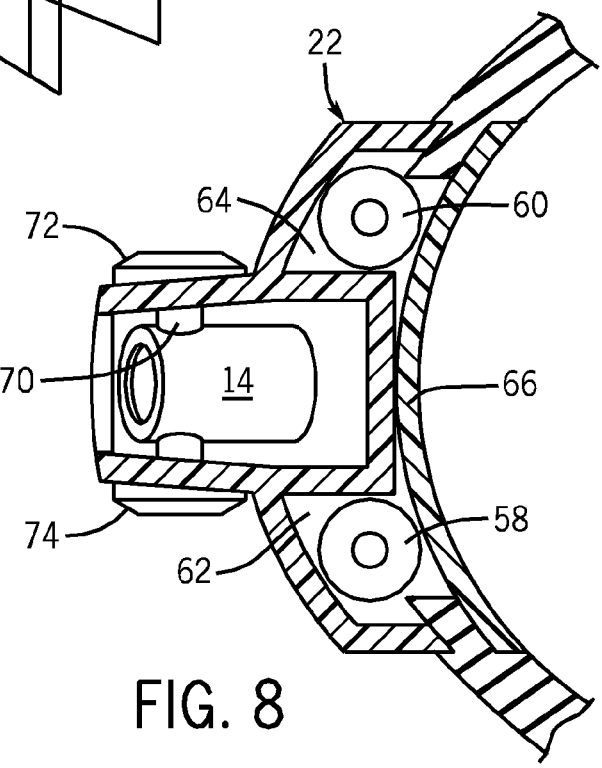
FIG. 8 is a horizontal sectional view taken along line 8-8 in FIG. 3.

Referring now to FIGS. 7 and 8, as mentioned, the polychromatic white light source 16 and the laser light source 14 for the targeting and positioning system are mounted in the lighting chamber 42 in the rigid connection piece 22. Preferably, battery 60 provides power for the polychromatic light source 16 and the battery 58 provides power for the laser light source 14, both through the electronics board 68. In the preferred embodiment, 1.5V DC power is provided to each of the light sources 14 and 16.

The preferred laser light source 14 is a Class 1, Class 2 or Class 2M LED light source, outputting a red or green beam. A suitable LED operates on a low level of DC current. As illustrated in FIGS. 7 and 8, the LED 14 is mounted to an axle 70. The axle 70 is mounted horizontally to the walls of the rigid connector 22 and spans across the lighting chamber 42. The axle 70 at each end passes through the walls of the rigid connector piece. A hub 72, 74 is attached to either end of the axle 70 to secure the axle 70 in place. The LED 14 is fixed in relation to the axle 70, however, the rotational position of the axle 70 can be adjusted by turning a screw, FIG. 5, associated with the hub 74. The angular orientation of the LED 14 will normally be set in the factory as mentioned above, but the screw 76 allows the user to adjust its position in the field. If desired, the body of the rigid connector 22 can include demarcations (not shown) providing a rough estimate to the user of the standoff distance corresponding to the position of the screw 76.

The polychromatic light 16 is preferably an LED having a wide white light spectrum and drawing a low level DC current. The purpose of the polychromatic light source 16 as mentioned is to effectively light the surface being painted so that the painter can see the true color of the surface and the paint being applied to the surface. Note that the polychromatic light source 16 is supported by a downward extending flange 78 from the top wall of the rigid connector 22.

Figure 9:
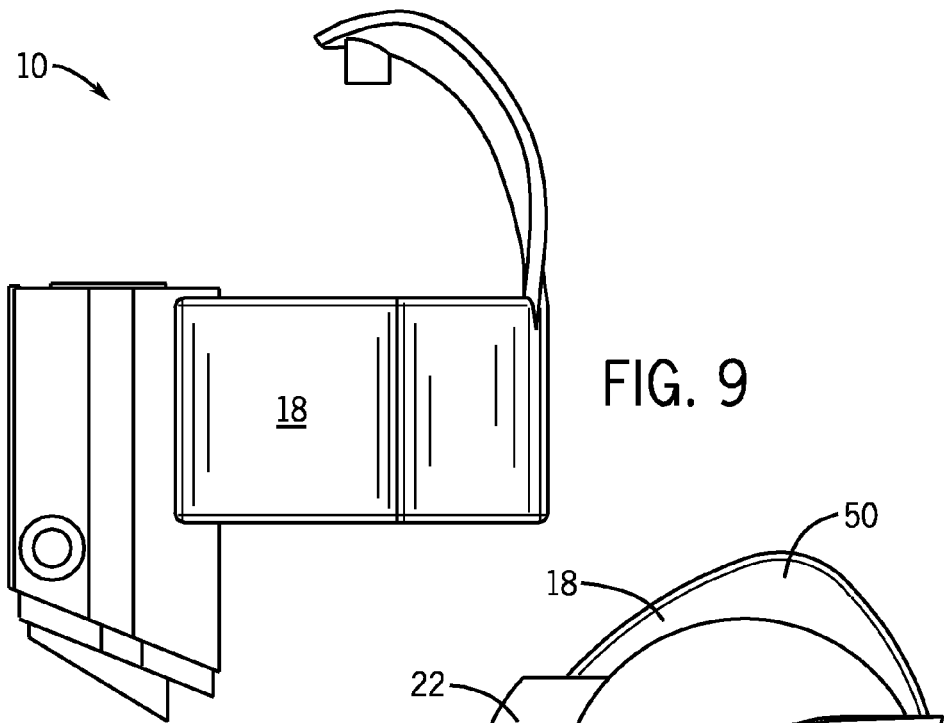
FIG. 9 is a side elevational view of an ergonomic adapter constructed in accordance with the first embodiment of the invention.
Figure 10:
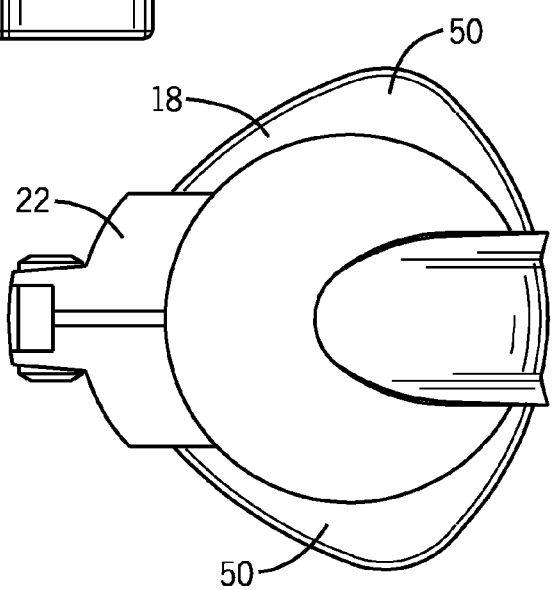
FIG. 10 is a top plan view of the ergonomic adapter constructed in accordance with the first embodiment of the invention.
Figure 11:
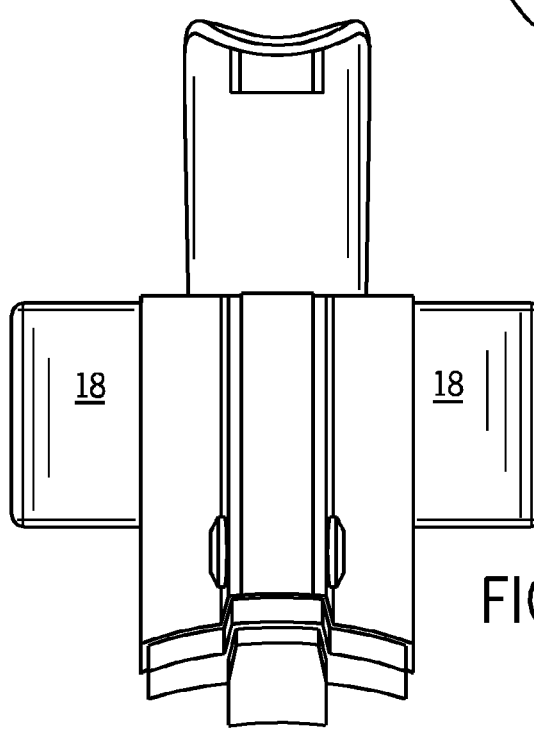
FIG. 11 is a front elevational view of an ergonomic adapter constructed in accordance with the first embodiment of the invention.

Referring now to FIGS. 9-13, many aspects of the design of the ergonomic adapter 10 are ornamental in nature, however, many of the dimensions are chosen for functional purposes. For example, referring specifically to FIGS. 10 and 13, the inside surface of the collar 20 is preferably cylindrical in shape and preferably measures slightly greater than 2½ inches (e.g. substantially about 2.54 inches) across the diameter. This diameter is chosen because it is slightly smaller than the standard aerosol paint can. It should not be greater than 2.7 inches to fit most standard sized spray paint cans. However, some spray paint cans, as well as other types of aerosol spray cans, have a different diameter, and the collars 20 for the adapter should be sized accordingly for these cans. The adapter 10 will normally need to stretch slightly in order to fit over a standard spray can 12. Note that the curvature for the inside wall of the rigid connector 22 should be consistent with the curvature of the inside surface of the collar 18. Referring now to FIGS. 9, 11 and 12, the preferred height of the collar 18 is slightly less than 1.5 inches. This size has been selected because with the preferred collar material, it provides a good balance of friction for holding the adapter 10 to the spray can 12 and also provides significant room for ergonomic gripping of the collar, while at the same time is not inconvenient for the user to fit over a standard spray can.

The traction pads 50 shown in FIGS. 10 and 13 are located rearward of the stop 54, FIG. 13 on the finger strip for the push-button nozzle. The maximum thickness across the collar 18 at the traction pads 50 is preferably about 0.5 inches, although it may be desirable to make the traction pads 50 smaller in order to accommodate users with small hands. It should also be noted that it is important that the rigid connector piece 22 and the contained electronics do not extend too far forward from the push-button nozzle 36 when the adapter 10 is mounted to a spray can 12. In the preferred embodiment of the invention, the distance from of the rear of the adapter 10 to the front portion of the rigid connector piece 22 is slightly greater than 3¼ inches. This distance has been found to be suitable in the preferred configuration, shown in FIGS. 1 and 3, in which the rigid connector 22 does not extend significantly higher than the interface between the can body and the domed top when the adapter 10 is fitted to a standard spray can 12.

Referring now to FIG. 14, a second embodiment of the invention is shown. In FIG. 14, the rigid adapter 222 does not include any electrical components as in the embodiment disclosed in FIGS. 1-13. The purpose of the rigid connector 22 is merely to connect the arms 20 of the collar together. Preferably, the dimensions across the rigid connector 222 shown in FIG. 14 between the arms 20 of the collar 18 are the same as with the rigid connector 22 shown in FIGS. 1-13. In this way, the adapter components molded from resilient elastomeric material, namely the collar and the arcuate finger strip can be used with either adapter 222 (FIG. 14) which contains no electronics or the adapter 22 (FIGS. 1-13) which contains the polychromatic light source 16 and the single beam light source 14. The connector piece 222 in FIG. 14 also preferably includes an alignment guide 228 as described above in the other embodiment.

While the invention has been described in connection with two embodiments, those skilled in the art should recognize that the various aspects of the invention can be embodied in other configurations than those described specifically in these embodiments. For example, an ergonomic adapter constructed in accordance with the described invention need not require a rigid connector. Those skilled in the art will recognize that it would be possible to construct a system in which an elastomeric collar 18 extends completely around the spray can 12. Also, those skilled in the art will recognize that it may be desirable to implement the invention with a polychromatic light source and without the laser guide, or alternatively with the laser guide and without the polychromatic light source. Further, as mentioned, it may be desirable to use a dual beam targeting and positioning technique instead of the single beam technique shown specifically in the drawings.

Those skilled in the art should appreciate that use of the invention as described in FIGS. 1-13 helps users reduce the most common quality problems associated with spray painting, namely running and overspray. It also improves visualization of the paint surface. While embodiments of the ergonomic adapter have been described for use in connection with aerosol spray cans, an ergonomic adapter made in accordance with the invention can be used in connection with other types of aerosol spray cans, such as insecticides or industrial lubricants, although not all of the features described herein may be particularly useful in those applications. Those skilled in the art should also appreciate that both of the embodiments significantly reduce finger pain and hand fatigue. The dimensions of the preferred ergonomic adapter 10, 210 have been chosen to provide a universal fit that fits most spray cans. The adapter reduces stress and pain on the distal tip of the finger. Furthermore, those skilled in the art should appreciate that the product is easy to use and has a relatively low cost to produce.

We claim:

1. For use in connection with an aerosol spray can having a push-button nozzle extending upward from a top surface of the can, an ergonomic adapter comprising:
   a collar that fits around a body of the aerosol spray can such that a front portion of the collar is facing in front of the can and in the direction in which contents of the can are expelled from the push-button nozzle on the top of the spray can;
   an arcuate finger strip made of a resilient, flexible material that is molded to receive an index finger of the user and that extends from a rear side of the collar upward and over the push-button nozzle on the spray can when the adapter is fitted onto the body of the spray can, wherein the flexible arcuate finger strip bends as the user presses downward on the finger strip with the index finger and a bottom surface of the finger strip engages the push-button nozzle when the user presses downward on the finger strip, thereby causing the push-button nozzle to be actuated to expel contents from the can;
   comprising a stop for engaging the push-button nozzle on the spray can when the adapter is fitted onto the body of the spray can, the stop extending downward from the bottom surface of the arcuate finger strip and providing a seating location for the push-button nozzle against the bottom surface of the finger strip.

2. An ergonomic adapter as recited in claim 1 wherein the collar comprises two arcuate arms each extending forward from the location that the finger strip attaches to the collar and the adapter further comprises a rigid connecting piece to connect the ends of the collar arms in the front of the can.

3. An ergonomic adapter as recited in claim 2 wherein the collar is made of elastomeric material having a durometer of between 30 to 90.

4. An ergonomic adapter as recited in claim 3 wherein in the inside diameter of the collar is no more than 2.7 inches.

5. An ergonomic adapter as recited in claim 2 wherein the arms of the collar and the finger strip are made of the same resilient material.

6. An ergonomic adapter as recited in claim 5 wherein the surface of the collar arms and the finger strip has a rough finish.

7. An ergonomic adapter as recited in claim 2 further comprising a light beam positioning arrangement including a light beam generator mounted on the rigid connection piece, and the adapter further comprises an adjustment mechanism for the light beam generator which changes the angular orientation of the light beam propagating from the light beam generator.

8. An ergonomic adapter as recited in claim 2 further comprising a polychromatic light source for illuminating the surface, the polychromatic light source being mounted on the rigid connection piece.

9. An ergonomic adapter as recited in claim 2 wherein the rigid connection piece includes at least one compartment facing forward which houses one or more light sources for illuminating the surface or for facilitating the positioning of the spray can, the compartment having a forward facing opening, and the adapter further comprising a transparent lens that attaches to the rigid connecting piece and covers the front opening in the compartment housing the one or more light sources.

10. An ergonomic adapter as recited in claim 2 wherein the rigid connecting piece includes two separate compartments for housing elongated cylindrical batteries, each compartment being substantially vertical and located substantially symmetrical with respect to the vertical centerline of the rigid connecting piece.

11. An ergonomic adapter as recited in claim 10 wherein the batteries can be loaded into the respective compartment from the rear of the rigid connecting piece and the rigid connecting piece includes an arcuate cover for closing the battery compartments.

12. An ergonomic adapter as recited in claim 1 wherein the finger strip is an elongated arcuate strip which along a centerline has a concave upper surface in which the user's finger resides to operate the spray can.

13. An ergonomic adapter as recited in claim 1 wherein the stop is curved and sized to receive a push-button nozzle on a standard aerosol can.

14. An ergonomic adapter as recited in claim 13 wherein the collar comprises two arcuate arms extending forward from the location at the finger strip attached to the collar, and the collar arms are made of a resilient material and wherein the traction pads comprise an area on each arm of the resilient collar having a large thickness, the traction pads being located along the collar less than 90° from the centerline of the finger strip at the location at which it extends from the rear of the collar.

15. An ergonomic adapter as recited in claim 1 wherein each side of the collar includes traction pads for the user's hands.

16. An ergonomic adapter as recited in claim 1 further comprising a light beam positioning arrangement that projects at least one light beam towards a surface onto which the contents of the aerosol spray can are being applied, for use in positioning the spray can and the push-button nozzle on the spray can relative to the surface, wherein the light beam positioning arrangement includes a light beam generator that generates a light beam, and wherein the adapter and the light beam positioning arrangement are configured such that the light beam from the light beam generator is directed toward the surface within the spray pattern, and the light beam defines a point of light within the spray pattern upon striking the surface to provide a reference point for the user in determining the position of the spray can relative to the surface.

17. The invention as recited in claim 1 wherein the aerosol spray can contains spray paint.

* * * * *